(12) United States Patent
Hsu

(10) Patent No.: US 9,898,451 B2
(45) Date of Patent: Feb. 20, 2018

(54) CONTENT ADAPTATION BASED ON SELECTED REVIEWER COMMENT

(71) Applicant: Adobe Systems Incorporated, San Jose, CA (US)

(72) Inventor: Lawrence Hsu, San Mateo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 480 days.

(21) Appl. No.: 14/090,547

(22) Filed: Nov. 26, 2013

(65) Prior Publication Data
US 2015/0149882 A1   May 28, 2015

(51) Int. Cl.
G06F 17/24   (2006.01)

(52) U.S. Cl.
CPC .................................. *G06F 17/241* (2013.01)

(58) Field of Classification Search
CPC ...... G06F 17/24; G06F 17/241; G06F 17/211; G06F 17/212; G06F 3/1454
See application file for complete search history.

(56) References Cited

U.S. PATENT DOCUMENTS

| | | | |
|---|---|---|---|
| 4,463,442 A * | 7/1984 | Dachowski | G06F 3/0489 715/235 |
| 5,146,552 A | 9/1992 | Cassoria et al. | |
| 5,202,828 A | 4/1993 | Vertelney et al. | |
| 5,231,578 A | 7/1993 | Levin et al. | |
| 5,386,270 A | 1/1995 | Housel | |
| 5,388,194 A | 2/1995 | Vogel | |
| 5,428,529 A | 6/1995 | Hartrick et al. | |
| 5,577,188 A | 11/1996 | Zhu | |
| 5,596,700 A | 1/1997 | Darnell et al. | |
| 5,621,871 A | 4/1997 | Jaremko et al. | |
| 5,625,833 A | 4/1997 | Levine et al. | |
| 5,680,636 A | 10/1997 | Levine et al. | |
| 5,689,717 A | 11/1997 | Pritt | |
| 5,822,539 A | 10/1998 | van Hoff | |

(Continued)

OTHER PUBLICATIONS

"Advisory Action", U.S. Appl. No. 10/678,392, dated Jul. 13, 2006, 3 pages.

(Continued)

*Primary Examiner* — Wilson Tsui
(74) *Attorney, Agent, or Firm* — Wolfe-SBMC

(57) ABSTRACT

A content author can create adaptive content, which refers to electronic content that adapts to or changes based on the presentation context of the adaptive content. The presentation context of the adaptive content refers to characteristics of the device displaying or otherwise presenting the adaptive content. The adaptive content can be displayed to reviewers using computing devices with various different characteristics. These reviewers can provide various comments about the adaptive content, and data describing the presentation context of the adaptive content for the computing device used by the reviewer is included in metadata associated with the comment. The comments to the adaptive content are made available to the adaptive content author. When reviewing the comments, the author can select a comment and have the adaptive content displayed to the author using the presentation context of the adaptive content for the device used by the reviewer when the comment was entered.

20 Claims, 12 Drawing Sheets

(56) References Cited

U.S. PATENT DOCUMENTS

| | | | |
|---|---|---|---|
| 5,831,615 A | 11/1998 | Drews et al. | |
| 5,889,523 A | 3/1999 | Wilcox et al. | |
| 5,895,475 A | 4/1999 | Eisenberg | |
| 6,081,829 A | 6/2000 | Sidana | |
| 6,178,431 B1 | 1/2001 | Douglas | |
| 6,178,432 B1 | 1/2001 | Cook et al. | |
| 6,229,541 B1 | 5/2001 | Kamen et al. | |
| 6,262,728 B1 | 7/2001 | Alexander | |
| 6,262,732 B1 | 7/2001 | Coleman et al. | |
| 6,301,592 B1 | 10/2001 | Aoyama et al. | |
| 6,332,148 B1 | 12/2001 | Paine et al. | |
| 6,377,288 B1 | 4/2002 | Moran et al. | |
| 6,401,069 B1 | 6/2002 | Boys et al. | |
| 6,546,405 B2 | 4/2003 | Gupta et al. | |
| 6,584,479 B2 | 6/2003 | Chang et al. | |
| 6,661,438 B1 | 12/2003 | Shiraishi et al. | |
| 6,671,855 B1 | 12/2003 | Hayashi et al. | |
| 6,678,864 B1 | 1/2004 | Tsai | |
| 6,684,379 B2 | 1/2004 | Skoll et al. | |
| 6,687,876 B1 | 2/2004 | Schilit et al. | |
| 6,687,878 B1 | 2/2004 | Eintracht et al. | |
| 6,710,791 B1 | 3/2004 | Kodama et al. | |
| 6,721,921 B1 | 4/2004 | Altman | |
| 6,766,356 B1 | 7/2004 | Krautter | |
| 6,859,909 B1 | 2/2005 | Lerner et al. | |
| 6,871,318 B1 | 3/2005 | Wynblatt et al. | |
| 6,877,137 B1 | 4/2005 | Rivette et al. | |
| 6,917,965 B2 | 7/2005 | Gupta et al. | |
| 6,931,603 B2 | 8/2005 | Boegelund | |
| 6,956,593 B1 | 10/2005 | Gupta et al. | |
| 6,973,616 B1 | 12/2005 | Cottrille et al. | |
| 7,006,098 B2 | 2/2006 | Bickmore et al. | |
| 7,028,255 B1 | 4/2006 | Ayers | |
| 7,086,003 B2 | 8/2006 | Demsky et al. | |
| 7,148,905 B2 | 12/2006 | Hong et al. | |
| 7,243,301 B2 | 7/2007 | Bargeron et al. | |
| 7,418,656 B1 | 8/2008 | Petersen | |
| 7,523,391 B1 | 4/2009 | Eizenhoefer | |
| 7,533,338 B2 | 5/2009 | Duncan et al. | |
| 7,546,131 B1* | 6/2009 | Sidi | G06Q 10/107 455/466 |
| 7,620,648 B2 | 11/2009 | Cragun et al. | |
| 7,783,972 B2 | 8/2010 | Camps et al. | |
| 8,140,570 B2* | 3/2012 | Ingrassia | G06F 17/30038 706/10 |
| 8,261,182 B1 | 9/2012 | Petersen et al. | |
| 8,799,765 B1* | 8/2014 | MacInnis | G06F 17/241 715/230 |
| 9,116,654 B1* | 8/2015 | Shah | G06F 3/14 709/217 |
| 2001/0025303 A1 | 9/2001 | Fisher et al. | |
| 2001/0030664 A1 | 10/2001 | Shulman et al. | |
| 2001/0049701 A1 | 12/2001 | Howerton et al. | |
| 2002/0035697 A1 | 3/2002 | McCurdy et al. | |
| 2002/0078088 A1 | 6/2002 | Kuruoglu et al. | |
| 2002/0085030 A1 | 7/2002 | Ghani et al. | |
| 2002/0129057 A1 | 9/2002 | Spielberg | |
| 2002/0188638 A1 | 12/2002 | Hamscher | |
| 2003/0081000 A1 | 5/2003 | Watanabe | |
| 2003/0093556 A1 | 5/2003 | Yeung et al. | |
| 2003/0103071 A1 | 6/2003 | Lusen | |
| 2003/0189727 A1 | 10/2003 | Kloosterman et al. | |
| 2003/0204490 A1 | 10/2003 | Kasriel | |
| 2004/0034832 A1 | 2/2004 | Taylor et al. | |
| 2004/0169683 A1 | 9/2004 | Chiu et al. | |
| 2004/0194021 A1 | 9/2004 | Marshall et al. | |
| 2004/0205465 A1 | 10/2004 | Baker et al. | |
| 2004/0205479 A1 | 10/2004 | Seaman et al. | |
| 2004/0205545 A1 | 10/2004 | Bargeron et al. | |
| 2004/0221162 A1 | 10/2004 | Kongtcheu | |
| 2004/0255247 A1 | 12/2004 | Demsky et al. | |
| 2004/0260714 A1 | 12/2004 | Chatterjee et al. | |
| 2004/0260717 A1 | 12/2004 | Albornoz et al. | |
| 2004/0267798 A1 | 12/2004 | Chatterjee et al. | |
| 2005/0235272 A1 | 10/2005 | Skinner | |
| 2008/0119235 A1* | 5/2008 | Nielsen | G06F 3/0483 455/566 |
| 2010/0077291 A1* | 3/2010 | Takahashi | G06Q 10/10 715/230 |
| 2010/0325557 A1* | 12/2010 | Sibillo | G06F 3/0481 715/751 |
| 2011/0289401 A1* | 11/2011 | Fischer | G06F 17/211 715/232 |
| 2013/0304906 A1* | 11/2013 | Yavilevich | H04L 67/22 709/224 |
| 2013/0332813 A1* | 12/2013 | Heinrich | G06F 17/2247 715/234 |

OTHER PUBLICATIONS

"Document Management & Content Management", Retrieved at: http://www.fxap.com.sg/prdtSoftDetails.jsp?prdtid=278&catid=25 &prdtname=DocuWorks%99—DocuWorks™ 5.0 English, 2003, Copyright® AQ Fuji Xerox Asia Pacific, 2003, 5 Pages.

"Final Office Action", U.S. Appl. No. 10/678,392, dated Apr. 26, 2006, 15 pages.

"Final Office Action", U.S. Appl. No. 10/678,392, dated Jun. 14, 2007, 29 pages.

"Final Office Action", U.S. Appl. No. 10/678,392, dated Sep. 18, 2007, 28 pages.

"MapSoft Impress Pro Version 2.1 Product Manual", Mapsoft Computer Services Limited, Feb. 2003, 80 Pages.

"Network Time Protocol", Downloaded from <http://en.wikipedia.org/wiki/Network_Time_Protocol, Jun. 10, 2007, 6 Pages.

"Non-Final Office Action", U.S. Appl. No. 10/678,392, dated Oct. 18, 2007, 28 pages.

"Non-Final Office Action", U.S. Appl. No. 10/678,392, dated Nov. 21, 2005, 10 pages.

"Non-Final Office Action", U.S. Appl. No. 10/678,392, dated Dec. 26, 2006, 23 Pages.

"Non-Final Office Action", U.S. Appl. No. 12/193,626, dated Jul. 21, 2011, 21 pages.

"Non-Final Office Action", U.S. Appl. No. 12/193,626, dated Nov. 15, 2011, 21 pages.

"Notice of Allowance", U.S. Appl. No. 10/678,392, dated Apr. 23, 2008, 10 Pages.

"Notice of Allowance", U.S. Appl. No. 12/193,626, dated Aug. 15, 2012, 10 pages.

"Windows 2000", Downloaded at: http://en.wikipedia.org/wiki/Windows_2000, Jun. 10, 2007, 21 Pages.

Catlin, et al., "Internote: Extending a Hypermedia Framework to Support Annotative Collaboration", Hypertext 89 Proceedings, Nov. 1989, pp. 365-378.

Goede, et al., "A Methodology and Implementation for Annotating Digital Images for Context-appropriate Use in an Academic Health Care Environment", Jamia, vol. 11 pp. 29-41, Jan.-Feb. 2004, pp. 29-41.

Kahan, "Annotea: An Open RDF Infrastructure for Shared Web Annotations", Computer Networks, vol. 39, Issue 5, Aug. 5, 2002, pp. 589-608.

Mills, "Simple Network Time Protocol (SNTP)", Downloaded from: http://tools.ietf.org/html/rfc1361, Aug. 1992, 10 Pages.

* cited by examiner

CONTENT ADAPTATION BASED ON SELECTED REVIEWER COMMENT

BACKGROUND

As computing technology has advanced, various different types of computers have been developed, including handheld computers, tablet computers, desktop computers, and so forth. These different types of computers typically have displays of differing sizes. A large amount of content is available to computer users, with the same content oftentimes being accessible to computers having different display sizes. Some of this content is referred to as adaptive content, which is content that can change based on the display size of the computer displaying the content. When developing adaptive content, reviewers oftentimes can view the adaptive content on computers with different display sizes and provide comments regarding the adaptive content. Developing such adaptive content can be difficult, however, because reviewers can be using computers with different display sizes than the computer that the author of the adaptive content is using. This can result in the adaptive content being displayed differently on the author's computing device than on the reviewer's computing device, making it difficult for the author to fully understand and appreciate the comments.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a first computing device presents adaptive content. A reviewer comment is received regarding the adaptive content, and the presentation context of the adaptive content that identifies characteristics of the first computing device is obtained. Metadata associated with the reviewer comment is generated, the metadata identifying the presentation context of the adaptive content. The reviewer comment as well as the associated metadata is made available to a second computing device.

In accordance with one or more aspects, at a first computing device one or more comments regarding adaptive content received from reviewers at one or more additional computing devices are presented. A selection of one of the one or more comments is received. In response to selection of the one comment, the adaptive content is presented at the first computing device using a presentation context of the adaptive content for a second computing device, the second computing device comprising one of the one or more additional computing devices at which the selected one comment was received.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Content adaptation based on selected reviewer comment is discussed herein. A content author can create adaptive content, which refers to electronic content that adapts to or changes based on the presentation context of the adaptive content. The presentation context of the adaptive content refers to characteristics of the device displaying or otherwise presenting the adaptive content. For example, the presentation context can be a display width (e.g., a number of pixels) of the device displaying the adaptive content, and the adaptive content adapts or changes itself based on the display width of the device.

The adaptive content can be displayed or otherwise presented to users (referred to as reviewers) using computing devices with various different form factors and other characteristics. These reviewers can provide various comments about the adaptive content, indicating to the author of the adaptive content changes he or she might consider making to the adaptive content. For a comment made by a reviewer regarding the adaptive content, data describing the presentation context of the adaptive content for the computing device used by the reviewer in making the comment is included in metadata associated with the comment.

The comments to the adaptive content are made available to the adaptive content author so that he or she can review and alter the adaptive content as appropriate based on the comments. When reviewing the comments, the author can select a comment and have the adaptive content displayed to the author using the presentation context of the adaptive content for the device used by the reviewer when the comment was entered. Thus, even though the author may be viewing the adaptive content and comments on a computing device with a different display size than the reviewer, the adaptive content for a selected comment is displayed to the author as if he or she were using a computing device having the same display size as the reviewer. For example, if the reviewer entered a comment while viewing the adaptive content on a smartphone and the author reviewed the comment on a desktop computer, when the comment is selected by the author the adaptive content is displayed on the desktop computer as if the desktop computer had a display size of a smartphone. The author of the adaptive content is thus able to readily see what the reviewer was seeing when making the comment, and better appreciate the reviewer's comment.

Figure 1:
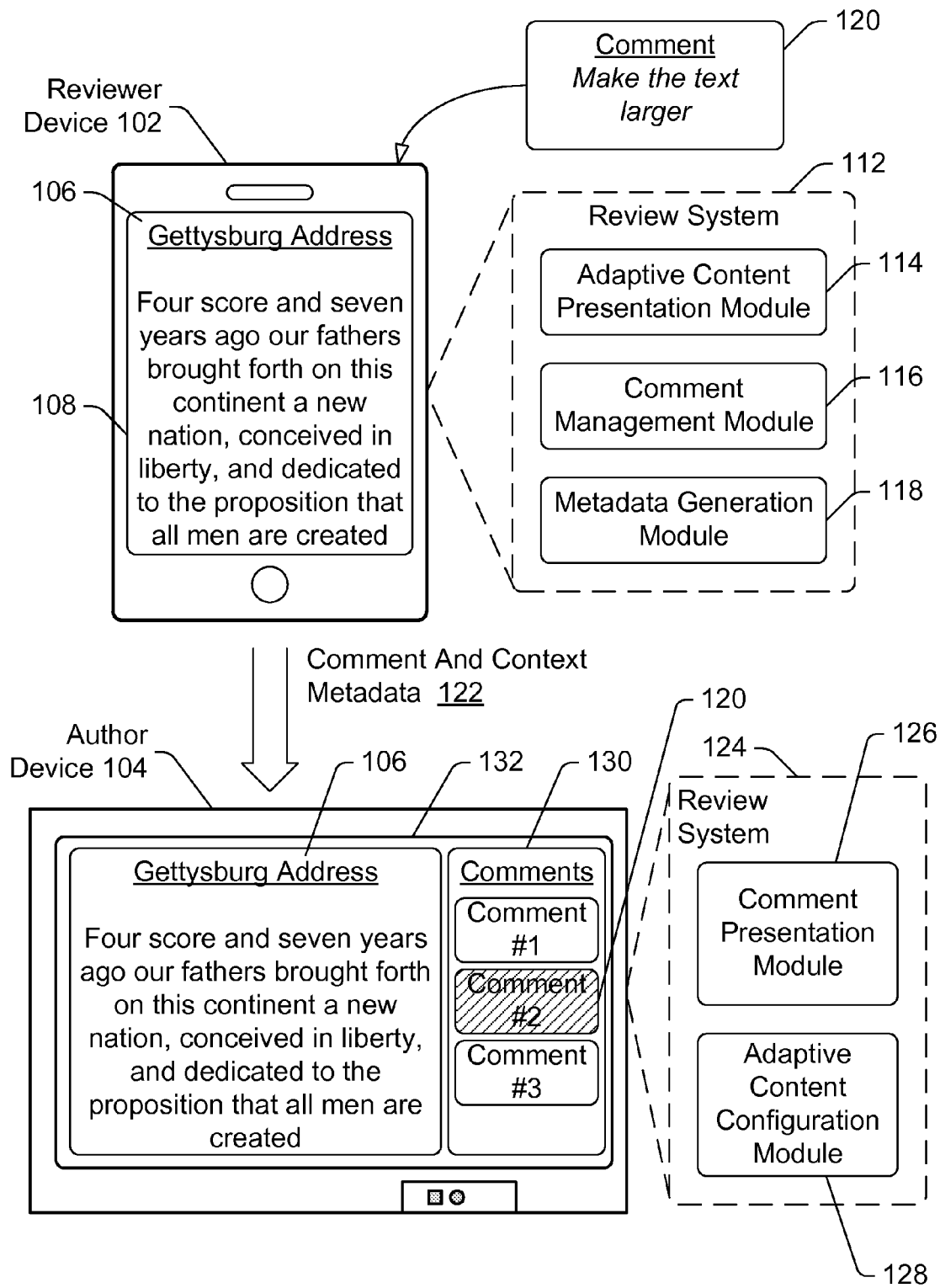
FIG. 1 illustrates an example system implementing the content adaptation based on selected reviewer comment in accordance with one or more embodiments.

FIG. 1 illustrates an example system 100 implementing the content adaptation based on selected reviewer comment in accordance with one or more embodiments. System 100 includes a computing device referred to as a reviewer device 102, and a computing device referred to as an author device 104. The reviewer device 102 is a computing device used by one or more people referred to as reviewers that are reviewing particular adaptive content. The reviewer device 102 is illustrated as having a form factor of a handheld device (e.g., a smartphone).

The author device 104 is a computing device used by an author of the particular adaptive content to review comments entered by one or more reviewers. The author of adaptive content refers to a person that develops or edits adaptive content. Although reference is made herein to a singular author, it should be noted that adaptive content can have multiple authors and that the techniques discussed herein apply to all authors of the adaptive content. The author device 104 is illustrated as having a form factor of a desktop computer. Although a single reviewer device 102 and single author device 104 are illustrated in system 100, it should be noted that multiple reviewer devices 102 can be used by one or more reviewers to review the particular adaptive content, and that multiple author devices 104 can be used by one or more authors to review comments entered by the one or more reviewers.

The reviewer device 102 and the author device 104 can each be a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, a wearable device such as a watch or eyeglasses, and so forth. Thus, reviewer device 102 and the author device 104 may each range from a full resource device with substantial memory and processor resources (e.g., personal computers, game consoles) to a low-resource device with limited memory and/or processing resources (e.g., traditional set-top boxes, hand-held game consoles). The reviewer device 102 and the author device 104 can be the same types of devices or alternatively different types of devices.

Adaptive content 106 is displayed on a display screen 108 of the reviewer device 102. The reviewer device 102 includes a review system 112 having an adaptive content presentation module 114, a comment management module 116, and a metadata generation module 118. The review system 112 can be implemented in different manners, such as by a component or module of an operating system of the reviewer device 102, by a component or module of a program that displays or otherwise presents adaptive content, by the adaptive content itself, combinations thereof, and so forth. The adaptive content presentation module 114 manages obtaining and presenting the adaptive content 106 on the reviewer device 102. When displayed on the reviewer device 102, the adaptive content 106 is configured or adapted to the characteristics of the reviewer device 102, such as the width of the display screen 108 of the reviewer device 102.

A reviewer using the reviewer device 102 enters a comment 120 regarding the adaptive content, illustrated as a comment that the text of the adaptive content should be made larger. The comment management module 116 manages the receipt and storage of the comment 120 from a user of the reviewer device 102.

The metadata generation module 118 generates metadata for the comment 120, the metadata including the presentation context of the adaptive content for the reviewer device 102 when the comment 120 was entered. The comment management module 116 makes both the comment and the metadata available 122 to the author device 104.

The author device 104 includes a review system 124 including a comment presentation module 126 and an adaptive content configuration module 128. The review system 124 can be implemented in different manners, such as by a component or module of an operating system of the author device 104, by a component or module of a program that displays or otherwise presents adaptive content, by the adaptive content itself, combinations thereof, and so forth. The comment presentation module 126 identifies multiple comments in a comment portion 130 of the author device 104, including the comment 120. Adaptive content configuration module 128 manages display of the adaptive content 106 on a display screen 132 of the author device 104.

The comment 120 is selected (e.g., by the author) at the author device 104, illustrated with cross-hatching through the comment 120 at the author device 104 in FIG. 1. In response to selection of the comment 120 at the author device 104, the adaptive content 106 is displayed in an area of the display screen 132 configured to have the same characteristics as the reviewer device 102 (e.g., as indicated in the presentation context included in the metadata associated with the comment 120). Thus, in response to selection of the comment 120 from the comment portion 130 at the author device 104, the author is able to view the adaptive content 106 as it was displayed by the reviewer device 102 regardless of whether the reviewer device 102 and the author device 104 are the same types of devices (e.g., have the same display screen sizes).

Figure 2:
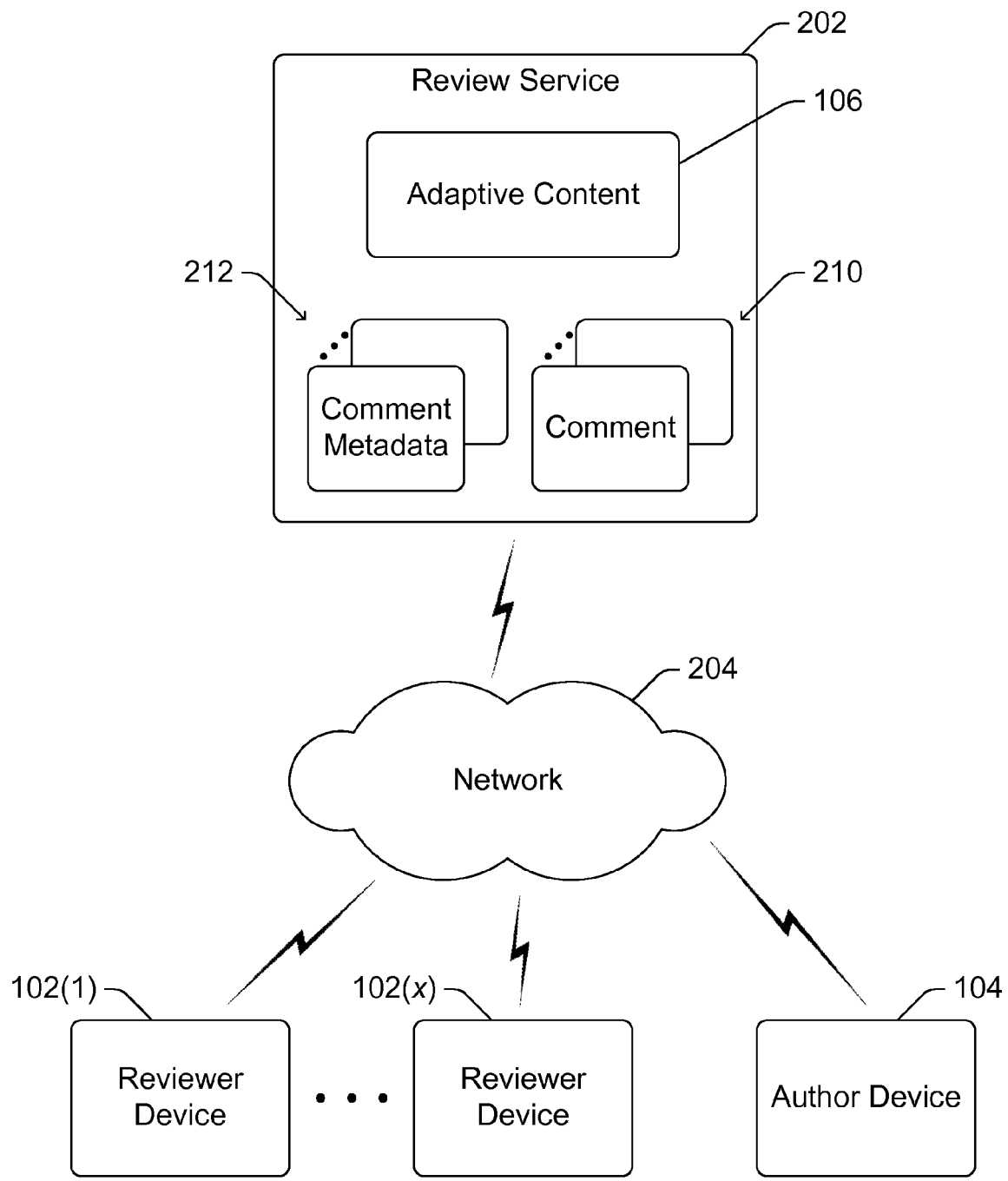
FIG. 2 illustrates another example system implementing the content adaptation based on selected reviewer comment in accordance with one or more embodiments.

FIG. 2 illustrates another example system 200 implementing the content adaptation based on selected reviewer comment in accordance with one or more embodiments. System 200 includes one or more reviewer devices 102(1), . . . , 102(x) as well as an author device 104, as discussed above with reference to FIG. 1, that can communicate with a review service 202 via a network 204. Different reviewer devices 102 can be the same type of device or different types of devices. Network 204 can be a variety of different networks, including the Internet, a local area network (LAN), a public telephone network, an intranet, other public and/or proprietary networks, combinations thereof, and so forth.

Adaptive content 106 is maintained by the review service 202, and can be accessed by the reviewer devices 102 and the author device 104. Comments can be added to the adaptive content 106 via the reviewer devices 102 as discussed above with reference to FIG. 1. The comments entered at the reviewer devices 102, as well as the metadata for the comments, are communicated from the reviewer devices 102 to the review service 202. The review service 202 maintains comments 210 regarding the adaptive content 106 as well as the metadata 212 for the comments. The author device 104 can access the adaptive content 106 as well as the comments 210 and comment metadata 212, and display or otherwise present the adaptive content 106, the comments 210, and optionally the comment metadata 212 as discussed in more detail below. Thus, the comments and metadata for the comments entered at the reviewer devices 102 are made available to the author device 104 via the review service 202.

In the example system of FIG. 2, the review service 202 includes the adaptive content 106. It should be noted that additional adaptive content, as well as comments and comment metadata for the additional adaptive content, can also be maintained in the review service 202.

Figure 3:
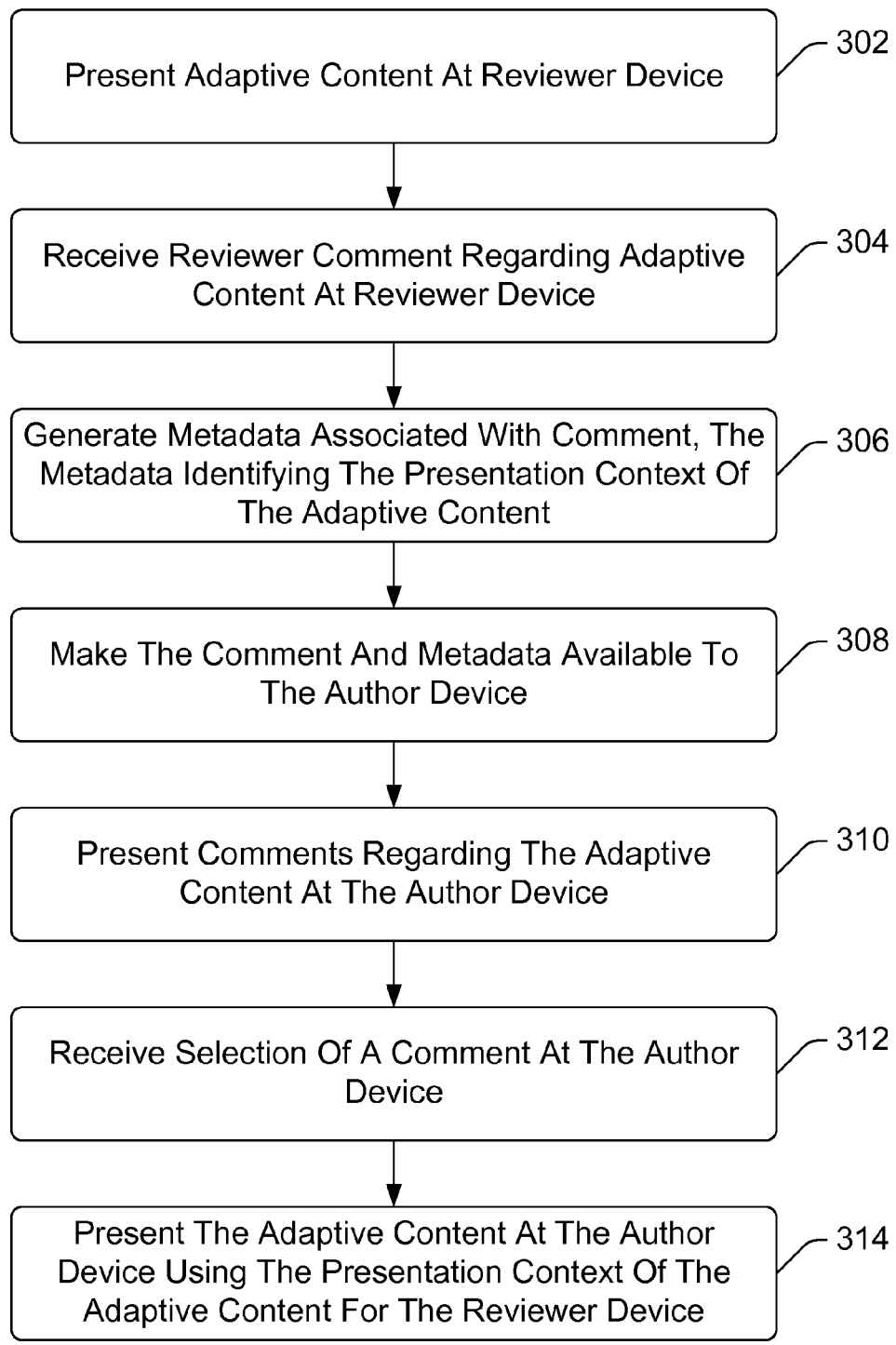
FIG. 3 is a flowchart illustrating an example process for a device implementing the content adaptation based on selected reviewer comment in accordance with one or more embodiments.

FIG. 3 is a flowchart illustrating an example process 300 for a device implementing the content adaptation based on selected reviewer comment in accordance with one or more embodiments. Process 300 is carried out by at least first and second computing devices, and can be implemented in software, firmware, hardware, or combinations thereof. These first and second computing devices are a reviewer device and an author device, such as the reviewer device 102 of FIG. 1 and the author device 104 of FIG. 1. Process 300 is shown as a set of acts and is not limited to the order shown for performing the operations of the various acts. Process 300 is an example process for implementing the content adaptation based on selected reviewer comment; additional discussions of implementing the content adaptation based on selected reviewer comment are included herein with reference to different figures.

In process 300, adaptive content is presented at a reviewer device (act 302). The adaptive content can be any type of electronic content that is presented by a computing device, such as by being displayed, played back audibly, and so forth. For example, the electronic content can include images, video, text, audio, combinations thereof, and so forth. In one or more embodiments the adaptive content is one or more Web pages (e.g., displayed by a Web browser or other program), although the adaptive content can alternatively be other types of content. The adaptive content can be obtained by the reviewer device in any of a variety of different manners, such as from a remote service, from a portable storage device, from a local store, and so forth.

The adaptive content is adapted to or changed based on the presentation context of the adaptive content. In act 302, the presentation context of the adaptive content refers to characteristics or properties of the reviewer device that is displaying or otherwise presenting the adaptive content. The adaptive content can be configured to adapt to or change based on at least one characteristic or property of the device that is displaying or otherwise presenting the adaptive content (the reviewer device in act 302). Different adaptive content can adapt to or change based on different characteristics or properties of the reviewer device.

In one or more embodiments, the characteristic of the device that the adaptive content adapts to or changes based on is the width of the display area (e.g., the display screen or a window displayed in the display screen) of the device. The width can be identified in various manners, such as a number of pixels in the display area, a number of inches or centimeters wide the display area is, and so forth. Alternatively, the adaptive content can adapt to or change based on other characteristics of the device. For example, the characteristic of the device that the adaptive content adapts to or changes based on can be the height of the display area (e.g., the display screen or a window displayed in the display screen) of the device, the geographic location of the device, the program used to display the adaptive content (e.g., which Web browser displays adaptive content that is a Web page), the day and/or time that the adaptive content is displayed, an orientation of the device (e.g., as determined by a gyroscope or other sensor of the device), a speed at which the device is moving (e.g., as determined using Global Positioning System (GPS) components of the device), a make and/or model of the device, combinations thereof, and so forth.

The manner in which the adaptive content adapts to or changes based on the presentation context is determined by the adaptive content itself. The author of the adaptive content can program or otherwise configure the adaptive content to change in different manners based on different characteristics. For example, the presentation context can be a display width (e.g., a number of pixels) of the device displaying the adaptive content, and the adaptive content adapts or changes itself based on the display width of the device, such as by displaying the adaptive content in two columns if the display width of the device is 680 pixels or more, and displaying the adaptive content in a single column if the display width of the device is less than 680 pixels.

Figure 4:
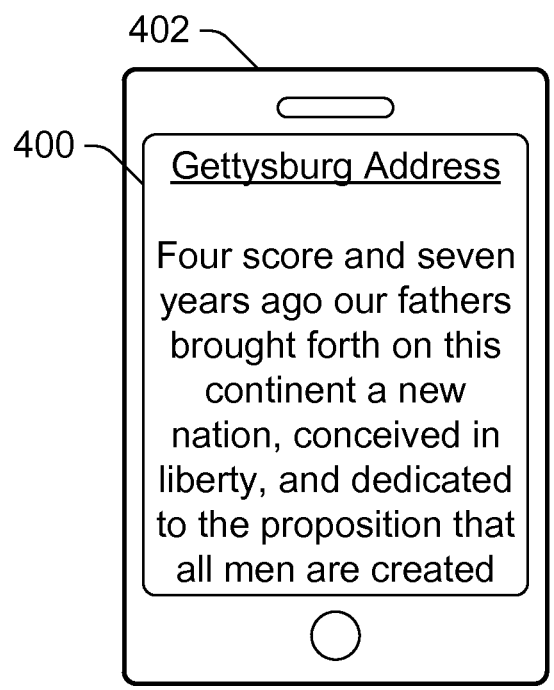
FIGS. 4, 5, 6, and 7 illustrate example displays of the adaptive content on a device in accordance with one or more embodiments.

By way of example, assume that adaptive content is a Web page that displays speeches by Abraham Lincoln. FIG. 4 illustrates an example display 400 of the adaptive content on a device 402 in accordance with one or more embodiments. The example display 400 assumes a presentation context of a particular display width (e.g., 320 pixels). As illustrated, given this presentation context, the adaptive content is illustrated as a single column. The user can optionally scroll up and/or down through the displayed adaptive content, or pan to the left and/or right through the displayed adaptive content, to have additional portions of the speech and/or additional speeches displayed.

Figure 5:
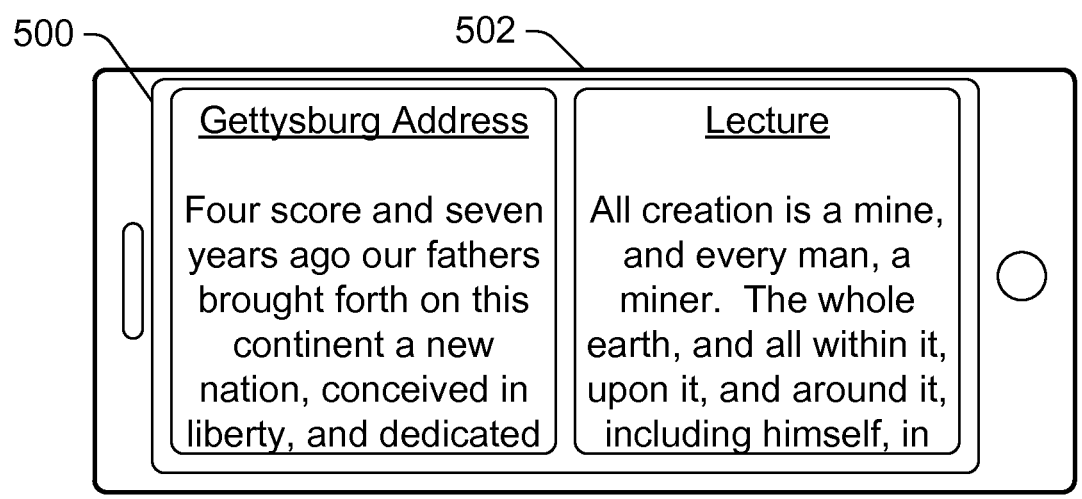

FIG. 5 illustrates an example display 500 of the adaptive content on a device 502 in accordance with one or more embodiments. The example display 500 assumes a presentation context of a particular display width (e.g., 680 pixels). As illustrated, given this presentation context, the adaptive content is illustrated as two columns, each column displaying a different speech. The user can optionally scroll up and/or down through the displayed adaptive content, or pan to the left and/or right through the displayed adaptive content, to have additional portions of the speeches and/or additional speeches displayed.

Figure 6:
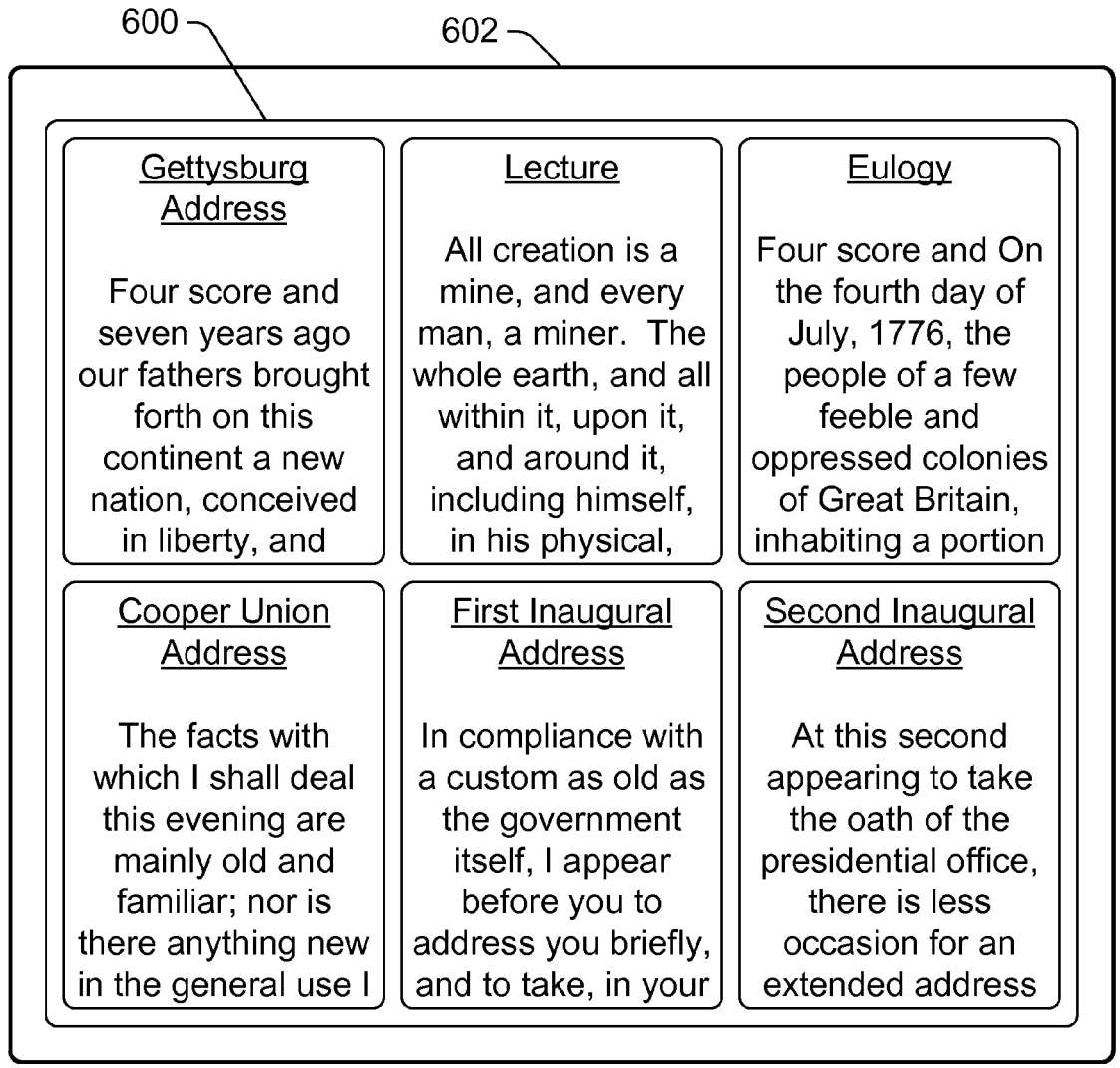

FIG. 6 illustrates an example display 600 of the adaptive content on a device 602 in accordance with one or more embodiments. The example display 600 assumes a presentation context of a particular display width (e.g., 768 pixels). As illustrated, given this presentation context, the adaptive content is illustrated as six sections, each section displaying a title and introductory portion of a different speech. The title and/or other portion of the speech displayed in a section can be selected by the user to have the entire selected speech displayed (e.g., on the entire display 600). The user can optionally scroll up and/or down through the displayed adaptive content, or pan to the left and/or right through the displayed adaptive content, to have additional portions of the speeches and/or additional speeches displayed.

Figure 7:
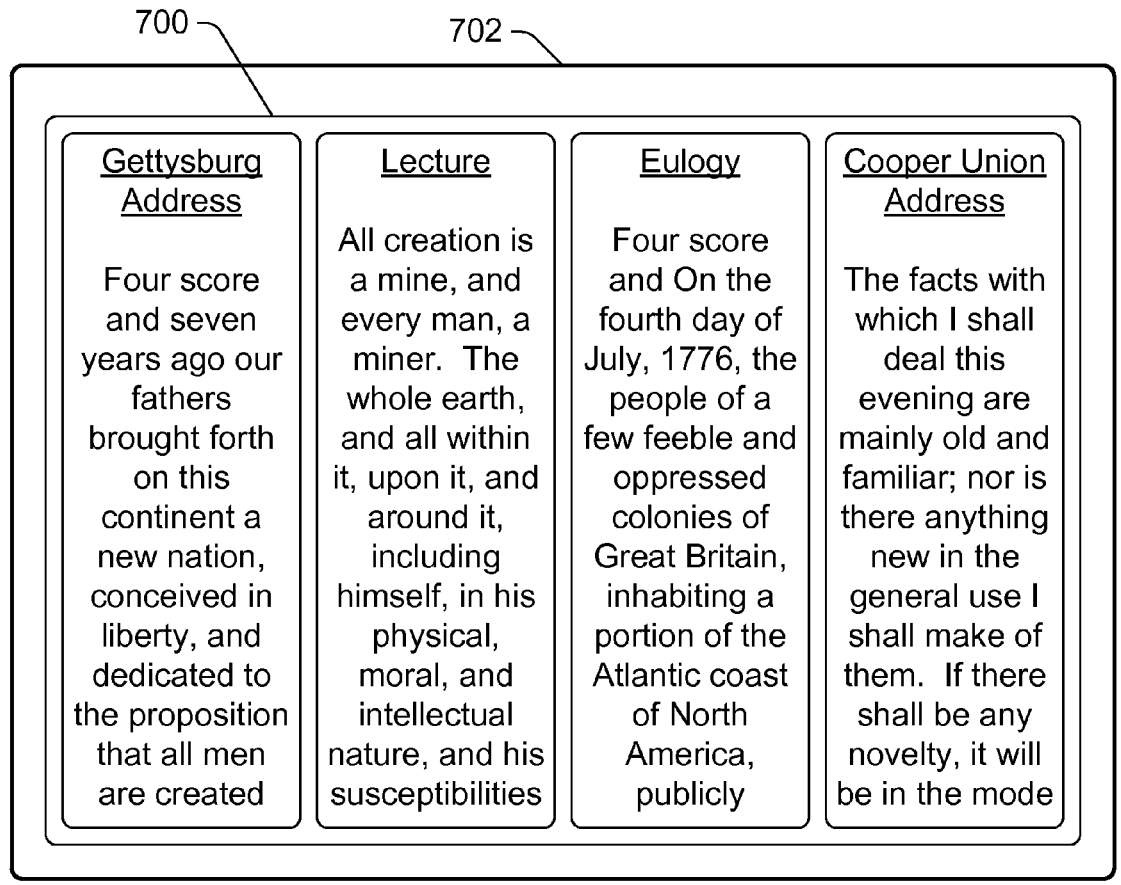

FIG. 7 illustrates an example display 700 of the adaptive content on a device 702 in accordance with one or more embodiments. The example display 700 assumes a presentation context of a particular display width (e.g., 1024 pixels). As illustrated, given this presentation context, the adaptive content is illustrated as four columns, each column displaying a different speech. The user can optionally scroll up and/or down through the displayed adaptive content, or pan to the left and/or right through the displayed adaptive content, to have additional portions of the speeches and/or additional speeches displayed.

It should be noted that the displays illustrated in FIGS. 4-7 can be the displays of different devices or alternatively can include displays of the same devices. For example, the display 400 of FIG. 4 can be for a device in one orientation (e.g., a portrait mode) and the display 500 of FIG. 5 can be for the same device in a different orientation (e.g., a landscape mode).

Returning to FIG. 3, although different numbers of columns are illustrated in FIGS. 4-7, the adaptive content can adapt to or change based on the presentation context in a variety of different manners. For example, font type or font size can change based on one or more characteristics of the device (e.g., the width and/or height of the display area, the speed at which the device is moving, the orientation of the device, and so forth). By way of another example, the language in which the adaptive content is displayed can change based on one or more characteristics of the device (e.g., the geographic location of the device).

A reviewer comment regarding the adaptive content is received at the reviewer device (act 304). Comments can be received from a reviewer in a variety of different manners. A comment can be received as a text input, as audio input, as a markup to the adaptive content being displayed, and so forth.

The reviewer device can support comment input in a variety of different manners. In one or more embodiments, the adaptive content includes a script file, such as a JavaScript file, that provides a user interface (UI) allowing the reviewer to input comments regarding the adaptive content. The UI is displayed or otherwise presented by the script file when the adaptive content is displayed or otherwise presented by the reviewer device.

Alternatively, a UI allowing the reviewer to input comments regarding the adaptive content can be provided at the reviewer device in different manners. For example, the reviewer device can include a module or component that presents a UI allowing the reviewer to input comments regarding the adaptive content. The UI can be presented concurrently with the reviewer device presenting the adaptive content.

Metadata associated with the comment is generated, the metadata identifying the presentation context of the adaptive content for the reviewer device (act 306). The metadata associated with the comment is generated by a metadata generation module, such as module 118 of FIG. 1. The metadata generation module can be implemented in different manners, such as being part of the adaptive content (e.g., included as part of the script file that allows the reviewer to input comments regarding the adaptive content), or alternatively can be separate from the adaptive content.

The metadata generation module can generate the metadata in a variety of different manners. In one or more embodiments, the metadata generation module uses a script language (e.g. JavaScript) to detect an interface (e.g., an Application Programming Interface (API)) used by the reviewer device. The interface can be an interface of a Web browser or other program that displays the adaptive content, the interface of an operating system of the reviewer device, the interface of another program or module, and so forth. The interface can be accessed by the metadata generation module to obtain the presentation context of the adaptive content. Alternatively, the metadata generation module can obtain the presentation context of the adaptive content in other manners, such as being pre-configured with the presentation context, accessing a registration store or other record of characteristics of the device, and so forth.

The metadata includes the presentation context of the adaptive content, and it should be noted that the presentation context can include characteristics of the reviewer device regardless of whether the adaptive content adapts to or changes based on the characteristics. For example, the metadata can include a width of the display area as well as a make and model of the device, even though the adaptive content may adapt to or change based on the width of the display area but not based on the make and model of the device. Alternatively, the presentation context can include only characteristics of the reviewer device that the adaptive content adapts to or changes based on.

The received reviewer comment and associated metadata are made available to the author device (act 308). The comment and associated metadata can be made available to the author device in a variety of different manners. In one or more embodiments, the adaptive content along with comments to the adaptive content and the associated metadata are maintained on a service accessible to both the reviewer device and the author device (e.g., via one or more data networks, such as a LAN, the Internet, and so forth), such as the review service 202 of FIG. 2. The received comments and associated metadata are saved at this service, and can be subsequently accessed by the author device. The received comments and associated metadata can be saved as part of the same data structure (e.g., the same file), or alternatively can be saved separately but with an identifier allowing the comments and associated metadata for particular adaptive content to be identified. In one or more embodiments, the received comments and associated metadata are saved using the JavaScript Object Notation (JSON) format, although other formats can alternatively be used.

Alternatively, the comment and associated metadata can be made available to the author device in other manners. For example, the comment and associated metadata can be emailed or otherwise electronically transferred from the reviewer device to the author device. By way of another example, the comment and associated metadata can be included in a container file (e.g., optionally using any of a variety of compression techniques) and emailed or otherwise electronically transferred from the reviewer device to the author device.

Comments that have been received from one or more reviewer devices regarding the adaptive content are presented at the author device (act 310). The comments can be displayed or otherwise presented in different manners, such as titles or other identifiers of the comments being displayed, the actual comments being displayed, and so forth. For each comment, at least some of the presentation context of the adaptive content when the comment was received can also be displayed or otherwise presented.

Figure 8:
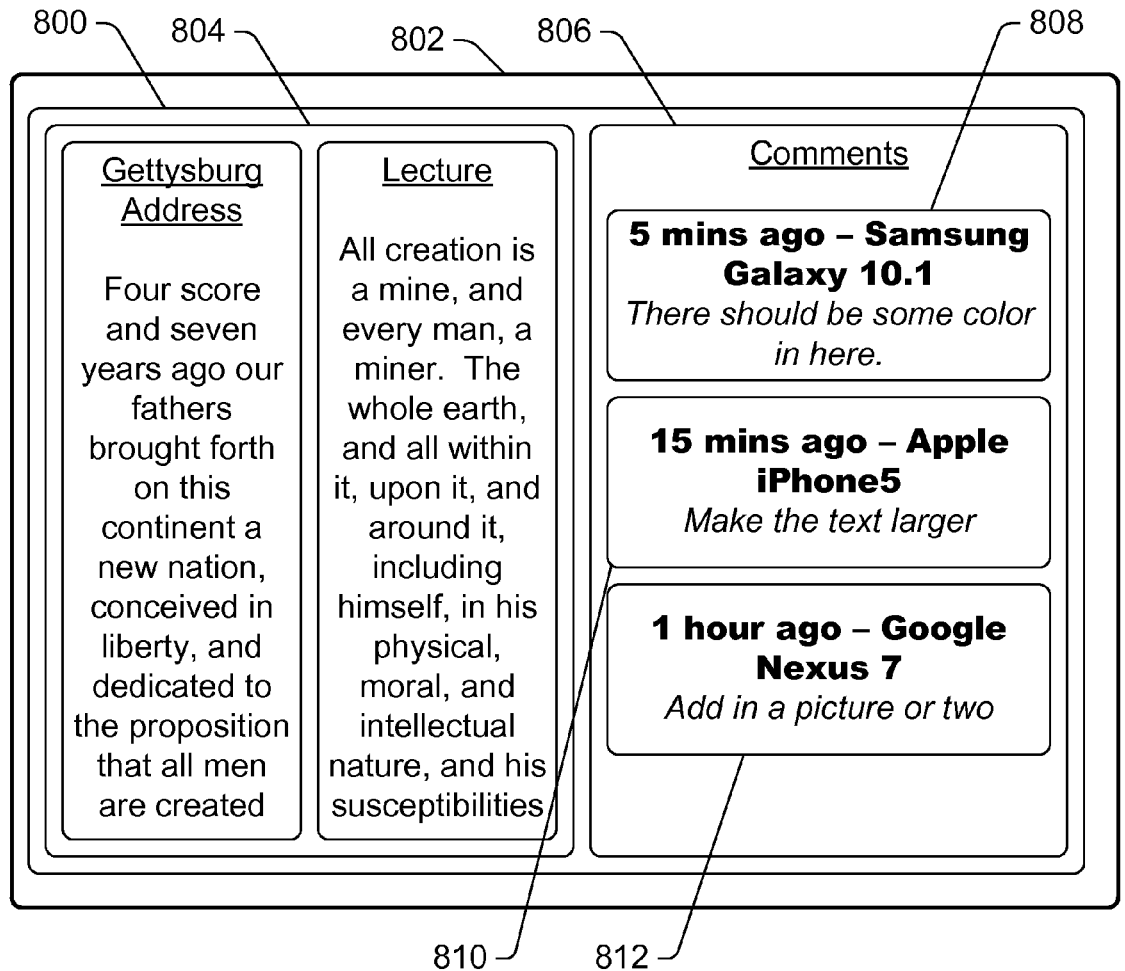
FIG. 8 illustrates an example display of comments regarding the adaptive content in accordance with one or more embodiments.

FIG. 8 illustrates an example display of comments regarding the adaptive content in accordance with one or more embodiments. An example display 800 on a device 802 is illustrated, displaying adaptive content in a canvas portion 804 and multiple comments that were received at one or more reviewer devices in a comment portion 806. The canvas portion 804 is a display area having particular dimensions, those dimension being determined by a comment presentation module, such as module 126 of FIG. 1. The dimensions include a height and width of the display area of the canvas portion 804, and the adaptive content adapts to or changes based on this width as discussed above.

The comment portion 806 includes multiple comments 808, 810, and 812. In the example of FIG. 8, the comments themselves are displayed, along with indications of when the comments were made. The illustrated indications are an indication of how long ago (e.g., a number of minutes) the comments were received (e.g., at a reviewer device), although the indications of when comments were made can alternatively be in different forms (e.g., a date and/or time of when the comments were received). Indications of at least part of the presentation context of the adaptive content for the reviewer device at which the comment was received are also displayed in the comment portion 806. For example, an indication of a make and model of the reviewer device can be displayed.

Returning to FIG. 3, a selection of a comment is received at the author device (act 312). The selection can be a user selection of a comment, such as the user touching or clicking on a particular comment (e.g., as displayed in comment portion 806 of FIG. 8). The selection of a comment can also be made by the module that presents the comments, or another module or component of the author device. For example, a module or component may select a first comment and then select subsequent comments (e.g., from most recently received to least recently received) waiting a particular amount of time (e.g., five or ten seconds) between each selection, or may select comments based on other rules or criteria.

In response to a selection of a comment in act 312, the adaptive content is displayed or otherwise presented at the author device using the presentation context of the adaptive content for the reviewer device (act 314). The reviewer device in act 314 is the reviewer device at which the selected comment was received, the presentation context of which is included in the metadata associated with the selected comment. The canvas portion of the display at the author device can be changed by an adaptive content configuration module of the author device, such as module 128 of FIG. 1, based on the presentation context included in the metadata associated with the selected comment. The canvas portion of the display is changed to have the same characteristics as the reviewer device when the selected comment was received at the reviewer device.

The adaptive content, in adapting to or changing based on the presentation context, can adapt to or change based on the characteristics of the canvas portion of the display. The adaptive content obtains characteristics of the author device, but the characteristics can include characteristics of the canvas portion of the display. For example, the characteristics of the device can include the width of the canvas portion (e.g., a window being displayed on a display screen) rather than the width of the entire display screen. The adaptive content can also adapt to or change based on other characteristics of the device regardless of the size of the canvas portion, such as based on an orientation of the device, a speed at which the device is moving, and so forth.

Thus, the adaptive content is displayed at the author device at least in part in the same manner as it was displayed at the reviewer device. For example, if the display area of the author device is 1024 pixels wide, but the display area of the reviewer device at which a particular comment was received was 320 pixels wide, then the canvas portion of the display at the author device is changed to 320 pixels wide, and the adaptive content adapts to or changes based on this width, and is displayed in the canvas portion as if the display area of the device were 320 pixels wide. By way of another example, if the adaptive content is displayed with a particular font size due to the speed at which the reviewing device was moving, then the adaptive content adapts to or changes based on this speed, and is displayed with that particular font size regardless of the speed at which the author device is moving.

Figure 9:
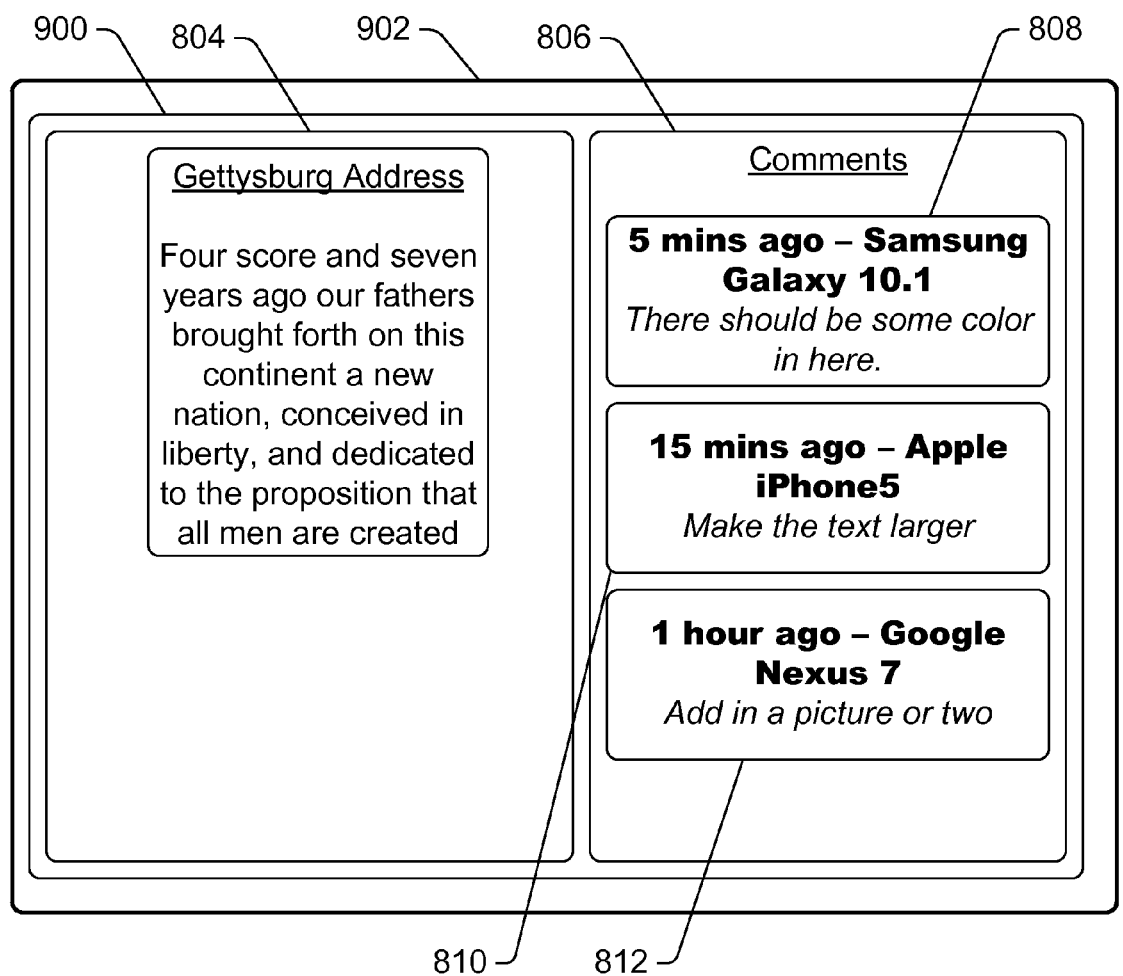
FIGS. 9, 10, and 11 illustrate example displays of adaptive content configured based on a selected comment in accordance with one or more embodiments.

FIG. 9 illustrates an example display of adaptive content configured based on a selected comment in accordance with one or more embodiments. An example display 900 on a device 902 is illustrated, including adaptive content displayed in a canvas portion 804 and multiple comments that were received at one or more reviewer devices displayed in a comment portion 806, analogous to display 800 of FIG. 8. However, in FIG. 9, the comment 810 has been selected, and the adaptive content is adapted to or changed based on the presentation context in the metadata associated with the comment 810. Thus, assuming comment 810 were received at a reviewer device displaying the content in a display area having a width of 320 pixels (e.g., as illustrated in FIG. 4), the canvas portion 804 is changed to have a width of 320 pixels. Thus, the adaptive content is displayed at the author device with the same display area width as the reviewer device, allowing the author to see the adaptive content as it was displayed at the reviewer device when the comment was received.

Returning to FIG. 3, in some situations the canvas portion of the display at the author device is changed based on the presentation context of the adaptive content for the reviewer device to be the same as the display area of the reviewer device. However, it should be noted that situations can arise in which the canvas portion of the display at the author device is changed based on only some of the presentation context of the adaptive content for the reviewer device. For example, the width of the canvas portion may be changed to be the same as the width of the display area of the reviewer device, but the height of the canvas portion may not be changed to be the same as the height of the display area of the reviewer device. In such situations, an indication of how the display area of the reviewer device differs from that of the author device can be displayed or otherwise presented at the author device. This indication can be displayed or otherwise presented in a variety of different manners.

Figure 10:
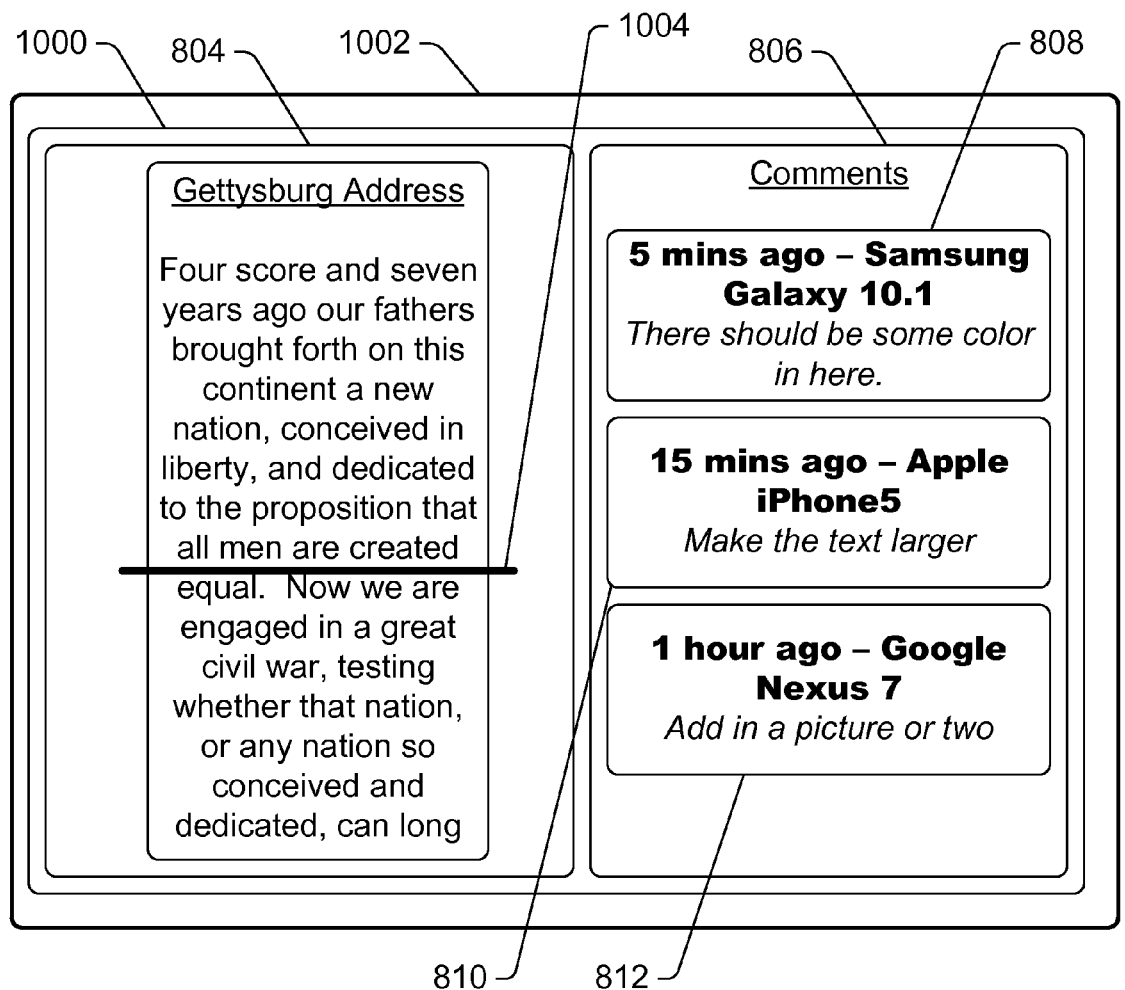

FIG. 10 illustrates another example display of adaptive content configured based on a selected comment in accordance with one or more embodiments. An example display 1000 of a device 1002 is illustrated, including adaptive content displayed in a canvas portion 804 and multiple comments that were received at one or more reviewer devices displayed in a comment portion 806, analogous to display 800 of FIG. 8. The comment 810 has been selected, and the adaptive content is adapted to or changed based on the presentation context in the metadata associated with the comment 810. The adaptive content is changed to have the same width as the display area of the reviewer device, but not the same height. Rather, a line 1004 is illustrated to show where the display area of the reviewer device would end based on the height of the display area of the reviewer device as indicated in the presentation context in the metadata associated with the comment 810. Thus, the author can readily see that the adaptive content in the area below the line 1004 would not be displayed at the reviewer device, whereas the adaptive content in the area above the line 1004 would be displayed at the reviewer device.

Figure 11:
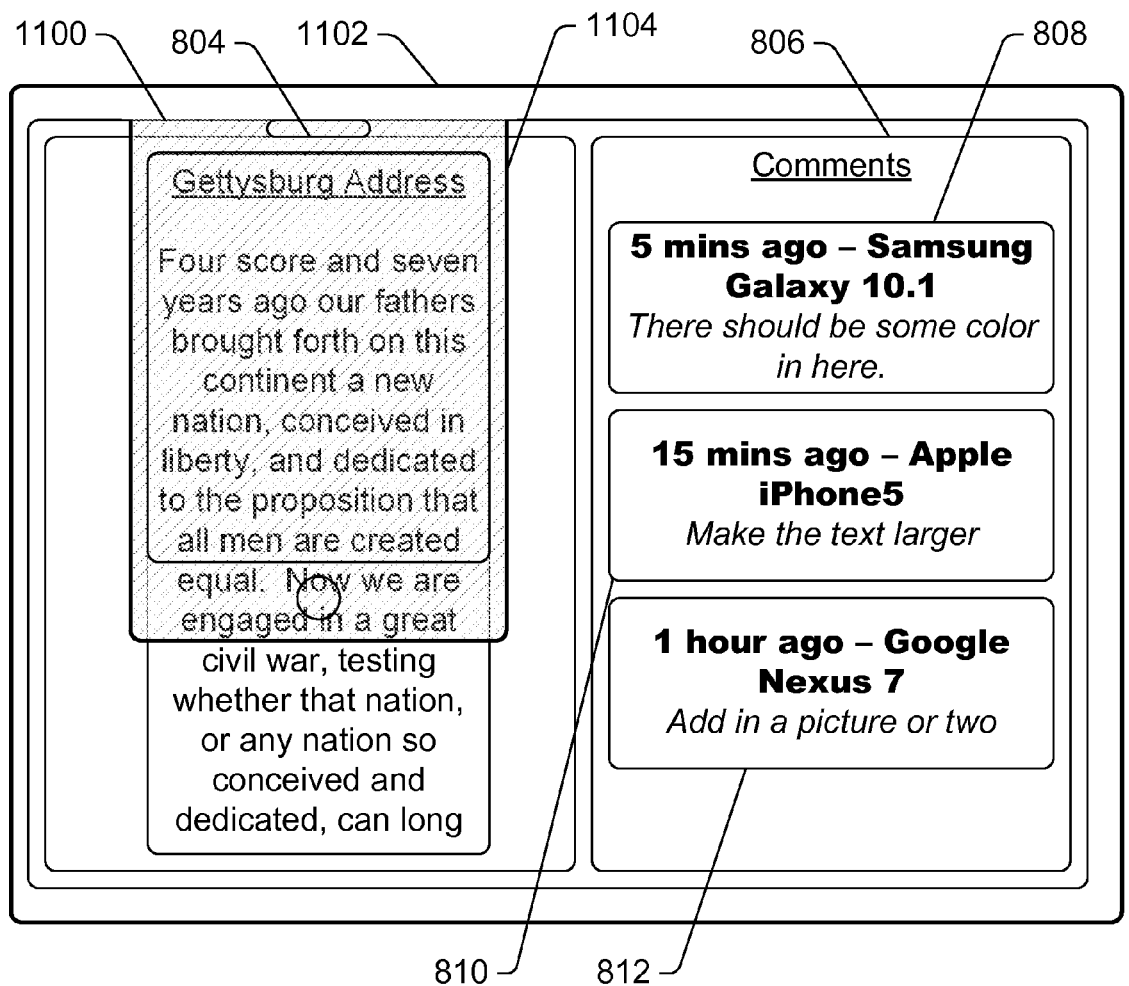

FIG. 11 illustrates another example display of adaptive content configured based on a selected comment in accordance with one or more embodiments. An example display 1100 on a device 1102 is illustrated, including adaptive content displayed in a canvas portion 804 and multiple comments that were received at one or more reviewer devices displayed in a comment portion 806, analogous to display 800 of FIG. 8. The comment 810 has been selected, and the adaptive content is adapted to or changed based on the presentation context in the metadata associated with the comment 810. The adaptive content is changed to have the same width as the display area of the reviewer device, but not the same height. Rather, an overlay 1104 is illustrated to show what the display area of the reviewer device is as indicated in the presentation context in the metadata associated with the comment 810. Thus, the author can readily see which parts of the adaptive content would be displayed at the reviewer device.

Returning to FIG. 1, it can thus be seen that comments can be input by a reviewer while viewing adaptive content displayed at a reviewer device. The comments and presentation context of the adaptive comment are provided to the author device, where the author can select one of the comments. The adaptive content is then displayed on the author device, and is configured (adapted or changed) for display as if the adaptive content were being displayed on the reviewer device at which the comment was input. The author can select one or more additional comments, and in response to each such selection the adaptive content is configured (adapted or changed) for display as if the adaptive content were being displayed on the reviewer device at which the selected additional comment was input.

Although particular functionality is discussed herein with reference to particular modules, it should be noted that the functionality of individual modules discussed herein can be separated into multiple modules, and/or at least some functionality of multiple modules can be combined into a single module. Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 12:
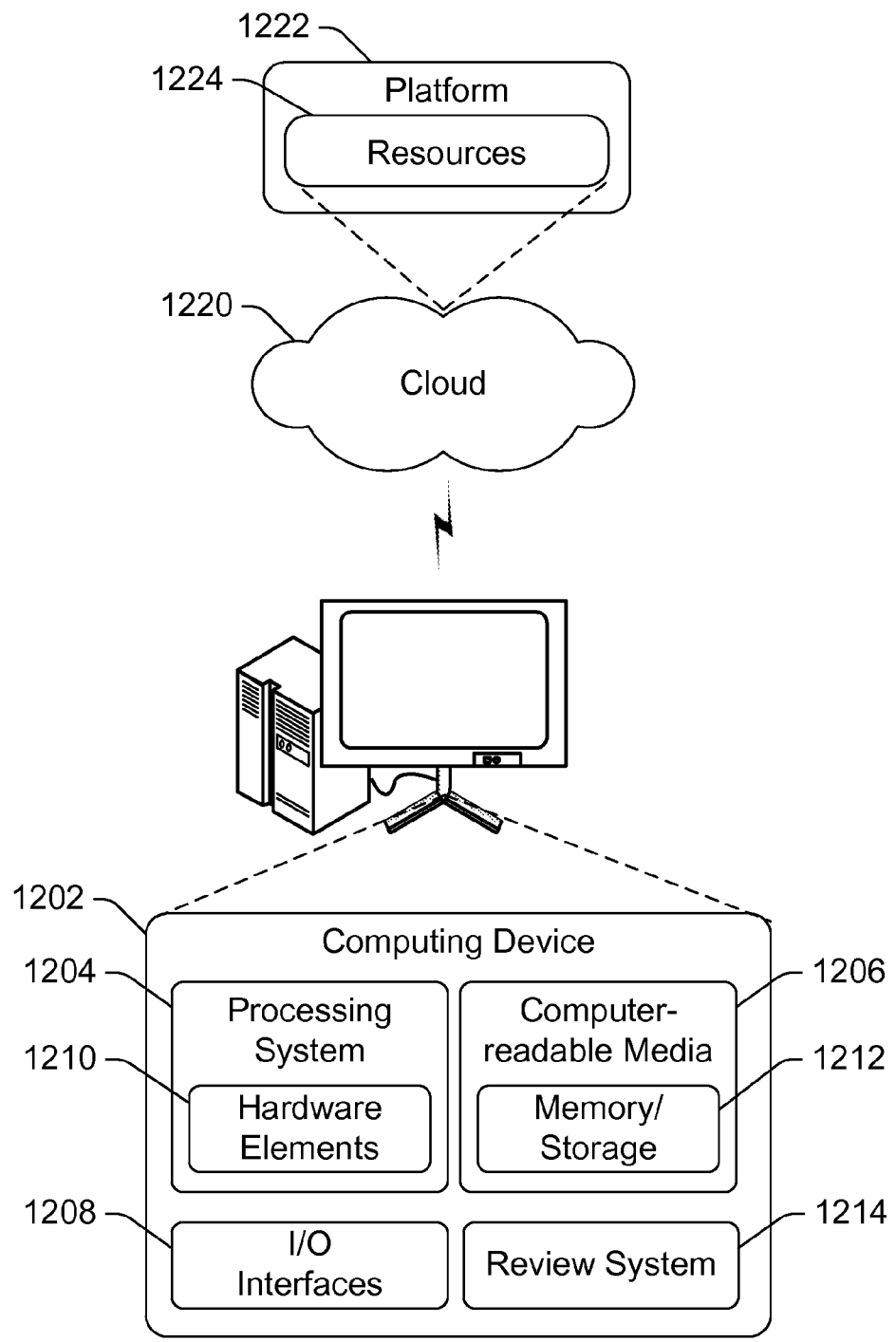
FIG. 12 illustrates an example system that includes an example computing device that is representative of one or more computing systems and/or devices that may implement the various techniques described herein.

FIG. 12 illustrates an example system generally at 1200 that includes an example computing device 1202 that is representative of one or more computing systems and/or devices that may implement the various techniques described herein. This is illustrated through inclusion of the review system 1214, which may be configured to receive reviewer comments (e.g., review system 112 of FIG. 1) or present reviewer comments (e.g., review system 124 of FIG. 1). Computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1204 is representative of functionality to perform one or more operations using hardware. Accordingly, processing system 1204 is illustrated as including hardware elements 1210 that may be configured as processors, functional blocks, and so forth. This may include implementation in hardware as an application specific integrated circuit or other logic device formed using one or more semiconductors. Hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 1206 is illustrated as including memory/storage 1212. Memory/storage 1212 represents memory/storage capacity associated with one or more computer-readable media. Memory/storage component 1212 may include volatile media (such as random access memory (RAM)) and/or nonvolatile media (such as read only memory (ROM), Flash memory, optical disks, magnetic disks, and so forth). Memory/storage component 1212 may include fixed media (e.g., RAM, ROM, a fixed hard drive, and so on) as well as removable media (e.g., Flash memory, a removable hard drive, an optical disc, and so forth). Computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. Computing device 1202 may be configured to implement particular instructions and/or functions corresponding to the software and/or hardware modules. Accordingly, implementation of a module that is executable by computing device 1202 as software may be achieved at least partially in hardware, e.g., through use of computer-readable storage media and/or hardware elements 1210 of processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of computing device 1202 and are not limited to the specific examples of the techniques described herein. This functionality may also be implemented all or in part through use of a distributed system, such as over a "cloud" 1220 via a platform 1222 as described below.

Cloud 1220 includes and/or is representative of a platform 1222 for resources 1224. Platform 1222 abstracts underlying functionality of hardware (e.g., servers) and software resources of cloud 1220. Resources 1224 may include applications and/or data that can be utilized while computer processing is executed on servers that are remote from computing device 1202. Resources 1224 can also include services provided over the Internet and/or through a subscriber network, such as a cellular or Wi-Fi network.

Platform 1222 may abstract resources and functions to connect computing device 1202 with other computing devices. Platform 1222 may also serve to abstract scaling of resources to provide a corresponding level of scale to encountered demand for resources 1224 that are implemented via platform 1222. Accordingly, in an interconnected device embodiment, implementation of functionality described herein may be distributed throughout system 1200. For example, the functionality may be implemented in part on computing device 1202 as well as via platform 1222 that abstracts the functionality of the cloud 1220.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a first computing device, the method comprising:
   presenting, by the first computing device, adaptive content;
   receiving, from a second computing device associated with a reviewer, a reviewer comment regarding the adaptive content;
   obtaining a presentation context of the adaptive content, the presentation context of the adaptive content identifying characteristics that describe visual presentation of the adaptive content of the first computing device;
   generating metadata associated with the reviewer comment, the metadata identifying the presentation context of the adaptive content to enable a visual overlay of the second computing device associated with the reviewer when entering the reviewer comment, the visual overlay providing a visual of which parts of the adaptive content would be displayed at the second computing device associated with the reviewer;
   displaying, at the first computing device, a canvas portion displaying the adaptive content and a non-overlapping, separate comment portion displaying the reviewer comment;
   receiving, at the first computing device, a selection of the displayed reviewer comment displayed at the separate comment portion to enable the visual overlay of the second computing device associated with the reviewer over the displayed adaptive content at the first computing device using the generated metadata;
   changing, at the first computing device and responsive to the receiving the selection of the displayed reviewer comment, the adaptive content to have a same width as a display area of the second computing device associated with the selected reviewer comment;
   displaying, at the first computing device, the visual overlay of the second computing device associated with the reviewer over the changed adaptive content; and
   making the reviewer comment and the associated metadata available to the second computing device associated with the reviewer.

2. A method as recited in claim 1, the making the reviewer comment and associated metadata available to the second computing device associated with the reviewer comprising communicating the reviewer comment and the associated metadata to a service accessible to the second computing device associated with the reviewer.

3. A method as recited in claim 1, the presentation context of the adaptive content identifying characteristics of the first computing device when the reviewer comment is received at the first computing device.

4. A method as recited in claim 1, the presentation context further including a height of the display of the first computing device.

5. A method as recited in claim 1, the presentation context including a geographic location of the first computing device.

6. A method as recited in claim 1, the presentation context including an orientation of the first computing device.

7. A method implemented in a first computing device, the method comprising:
   presenting adaptive content;
   presenting one or more text comments regarding the adaptive content received from reviewers at one or more additional computing devices;
   receiving a selection of one of the one or more comments, and wherein each comment has an associated generated metadata;
   changing, at the first computing device in response to the selection of the one of the one or more comments, the adaptive content to have a same width as a display area of a second computing device associated with the selected one of the one or more comments; and
   presenting, at the first computing device in response to the selection of the one of the one or more comments, the changed adaptive content using a presentation context of the adaptive content for the second computing device and a visual overlay, the presentation context identified by the generated metadata that describes characteristics of the second computing device to allow the visual overlay of the second computing device to be presented over the changed adaptive content, at the first computing device, which provides a visual of which parts of the adaptive content were displayed at the second computing device, the second computing device comprising one of the one or more additional computing devices at which the selected one comment was received.

8. A method as recited in claim 7, the selection comprising a user selection.

9. A method as recited in claim 7, the presentation context of the adaptive content for the second computing device identifying characteristics of the second computing device when the selected comment was received at the second computing device.

10. A method as recited in claim 7, further comprising:
    receiving a selection of an additional one of the one or more comments; and
    presenting, at the first computing device, the adaptive content using a presentation context of the adaptive content for a third computing device, the third computing device comprising one of the one or more additional computing devices at which the selected additional one comment was received and that is a different computing device than the second computing device.

11. A method as recited in claim 7, the presentation context including a height of the display screen of the second computing device, and the presenting the adaptive content using the presentation context further comprising displaying on the first computing device an indication of where display of the adaptive content for the second computing device ends.

12. A method as recited in claim 7, the presentation context including a height of the display screen of the second computing device, and the presenting the adaptive content using the presentation context further comprising displaying on the first computing device an overlay identifying a display area of the second computing device.

13. A method as recited in claim 7, the presenting one or more comments further comprising displaying, for each of the one or more comments, data identifying at least part of the presentation context of the adaptive content for the device at which the comment was received.

14. A computing device comprising:
    a display including a canvas portion in which adaptive content is displayed and a separate, non-overlapping comment portion in which multiple textual comments received from at least one corresponding remote computing device are displayed; and
    at least one non-transitory computer-readable storage media comprising instructions stored thereon that, responsive to execution by the computing device, causes the computing device to implement a review application programmed to change the canvas portion displayed at the computing device based on a presentation context of the adaptive content for one of the at least one remote computing device and further display an overlay when selection of one of the multiple textual comments was received, and wherein the canvas portion is changed such that a width of the adaptive content has a same width as a display area of the one of the at least one remote computing device corresponding to the selected one of the multiple textual comments, and the presentation context identified by metadata describes characteristics to allow a presentation of the visual overlay of the one of the at least one remote computing device corresponding to the selected one of the multiple textual comments, and the visual overlay presented over the changed canvas portion and providing a visual of which parts of the adaptive content were displayed at the at least one remote computing device.

15. A computing device as recited in claim 14, the one of the multiple comments having been selected by a user of the computing device.

16. A computing device as recited in claim 14, the review system being further configured to:
    receive a selection of an additional one of the multiple comments; and
    change the canvas portion based on a presentation context of the adaptive content for an additional one of the at least one remote computing device at which the selected additional one of the multiple comments was input.

17. A computing device as recited in claim 14, the presentation context including at least one of: a height of the display of the one of at least one remote computing device, a geographic location of the one of at least one remote computing device, or an orientation of the one of at least one remote computing device.

18. A computing device as recited in claim 14, the review application further programmed to make the selected one of the multiple textual comments and the associated metadata available to the one of the at least one remote computing device at which a selected one of the multiple textual comments was received.

19. A computing device as recited in claim 18, the making the selected one of the multiple textual comments and associated metadata available to the one of the at least one remote computing device at which a selected one of the multiple textual comments was received comprising communicating the selected one of the multiple textual comments and the associated metadata to a service accessible to the one of the at least one remote computing device at which a selected one of the multiple textual comments was received.

20. A computing device as recited in claim 14, the review application further programmed to receive a selection of an additional comment and present, at the computing device, the adaptive content using a presentation context of adaptive content for an additional computing device associated with the additional comment.

* * * * *